(12) United States Patent
Schrader (10) Patent No.: US 6,623,224 B2
(45) Date of Patent: *Sep. 23, 2003

(54) APPARATUS AND SYSTEM FOR SECURING CARGO

(75) Inventor: Darren E. Schrader, Portland, OR (US)

(73) Assignee: Schrader Dane Corporation, Portland, OR (US)

( * ) Notice: Subject to any disclaimer, the term of this patent is extended or adjusted under 35 U.S.C. 154(b) by 24 days.

This patent is subject to a terminal disclaimer.

(21) Appl. No.: 09/800,121

(22) Filed: Mar. 5, 2001

(65) Prior Publication Data

US 2001/0009637 A1 Jul. 26, 2001

Related U.S. Application Data

(63) Continuation-in-part of application No. 09/473,313, filed on Dec. 28, 1999, now Pat. No. 6,280,128, which is a continuation-in-part of application No. 08/961,610, filed on Oct. 31, 1997, now Pat. No. 6,113,327.

(51) Int. Cl.[7] ................................................. B60P 7/08
(52) U.S. Cl. ......................... 410/97; 410/96; 410/102
(58) Field of Search ........................... 410/96, 97, 102, 410/106, 143; 224/572, 534, 463, 493; 24/300, 301, 302, 265 CD, 115 K, 130; 182/8; 248/499

(56) References Cited

U.S. PATENT DOCUMENTS

| 1,009,522 | A | 11/1911 | Hunter |
|---|---|---|---|
| 1,521,619 | A | 1/1925 | Haas |
| 2,820,269 | A | 1/1958 | Wolff |
| 3,119,160 | A | 1/1964 | Hoppeler |
| 3,168,938 | A | 2/1965 | Shaver |
| 3,181,651 | A | 5/1965 | Larson |
| 3,388,454 | A | 6/1968 | Willis |
| 3,698,678 | A | 10/1972 | Bowers |
| 3,713,616 | A | 1/1973 | Bowers |
| 3,768,123 | A | 10/1973 | Forte |
| 3,871,481 | A | 3/1975 | Ballek |
| 3,997,027 | A | 12/1976 | Patterson et al. |
| 4,130,177 | A | 12/1978 | Pandolff |
| 4,198,020 | A | 4/1980 | Walker et al. |
| 4,205,426 | A | 6/1980 | Stillman, Jr. |
| 4,257,592 | A | 3/1981 | Jones |
| 4,261,436 | A | 4/1981 | Stillman, Jr. |
| 4,606,687 | A | 8/1986 | Mantela et al. |
| 4,694,541 | A | 9/1987 | Skyba |
| 4,716,630 | A | 1/1988 | Skyba |
| 4,818,006 | A | 4/1989 | Arndt |
| 4,827,742 | A | 5/1989 | McDonald |
| 4,969,784 | A | 11/1990 | Yanke |
| 5,003,672 | A | 4/1991 | Randall |
| 5,020,948 | A | 6/1991 | Ihara |
| 5,159,729 | A | 11/1992 | Walker |
| 5,245,729 | A | 9/1993 | Greff |
| 5,317,798 | A | 6/1994 | Thompson et al. |
| 5,423,644 | A | 6/1995 | First, Sr. |
| 5,494,388 | A | 2/1996 | Stevens |
| 5,603,591 | A | 2/1997 | McLellan |
| 6,113,327 | A | 9/2000 | Schrader |
| 6,280,128 | B1 | * 8/2001 | Schrader ...................... 410/97 |

OTHER PUBLICATIONS

Sportrack International, Inc, "Hitch Racks," products brochure, "Summer Only 1997," cover page, p. 2 ("Voyager Hitch Carriers") and back cover page.

* cited by examiner

Primary Examiner—Stephen T. Gordon
(74) Attorney, Agent, or Firm—ipsolon llp (57) ABSTRACT

A retractable securement apparatus and system for securing cargo to a support structure to prevent undesired relative movement between the cargo and the support. The apparatus comprises a strap contained in an elongate tubular member that is a component of one or both of the cargo or the support structure. One way strap stops fix ends of the strap relative to the tubular member yet allow the strap to be extended from a normally retracted position to an extended position in which hook members on one or both ends of the straps secure the cargo to the support.

8 Claims, 10 Drawing Sheets

APPARATUS AND SYSTEM FOR SECURING CARGO

RELATED U.S. APPLICATION DATA

Continuation-in-part of Ser. No. 09/473,313, filed Dec. 28, 1999, and now U.S. Pat. No. 6,280,128, issued Aug. 28, 2001, which is a continuation-in-part of Ser. No. 08/961,610, filed Oct. 31, 1997, and now U.S. Pat. No. 6,113,327, issued Sep. 5, 2000.

TECHNICAL FIELD

This invention relates to an apparatus and system for securely attaching cargo and the like to a support structure to prevent unwanted movement of the cargo relative to the support, for example during transport. More particularly, this invention relates to an apparatus and system for securing cargo such as ladders, hand trucks, sporting goods such as bicycles, kayaks and the like to support structures such as racks on motor vehicles, thereby preventing undesired movement of the cargo while the motor vehicle is moving.

BACKGROUND OF THE INVENTION

Whenever cargo is transported on a moving vehicle it is essential that the cargo be securely attached to the vehicle. Without secure attachment between the cargo and the vehicle, shifting or other movement of the cargo may occur as the vehicle moves, leading to damage to the cargo or even to accidents in which not only may the cargo be damaged, but people may be injured.

There are many methods for attaching cargo to vehicles, most of the methods depending upon the nature of the cargo and the kind of vehicle transporting the cargo. One of the most common methods of securing cargo, and one that is both useful and effective, is to strap the cargo to the vehicle, or to a rack on the vehicle, with one or more cargo straps. For instance, cargo may be supported on a vehicle rack and one or more straps are connected between the cargo and the rack to provide a secure attachment and to prevent undesired movement of the cargo during transport.

The strap method is used with many kinds of cargoes and vehicles, from logs carried on logging trucks to relatively smaller cargo items such as boxes carried in the bed of a standard pick up truck. The use of straps to tie cargo to a supporting structure is particularly useful with relatively lighter cargoes such as ladders, hand trucks, wheelbarrows and other light industrial tools that are attached to racks for pick up trucks or car-top racks for automobiles.

However, a common problem encountered with using straps to secure cargo to a vehicle is that the straps are often misplaced or lost, or are not readily available when the time comes for strapping the cargo to the rack. As anyone who has experienced a lost cargo strap knows, a lost strap can be a significant inconvenience, as an inordinate amount of time can be spent hunting for the lost strap. In addition, when securing cargo to a rack it is often necessary to have the strap immediately available at the time the cargo is loaded onto the rack, for instance when the strap itself provides part of the support system for the cargo. As an example, ladders are often transported on pick up truck racks. Occasionally the ladders are attached to the vertical support posts that support the upper portions of the rack, with the ladder oriented such that the rungs extend in the vertical direction and the longitudinal axis of the ladder oriented along the length of the truck. If there are no shelves on the rack to support the ladder, the straps that secure the ladder to the rack may also serve the function of supporting the ladder on the rack.

When this kind of attachment is used it is necessary to strap the ladder in position on the rack at the same time it is lifted into place. This can be difficult since the ladder may be heavy and unwieldy, especially if only one person is lifting the ladder into position. As such, it is necessary to have the attaching straps in hand and ready when the ladder is lifted into position. Obviously, if the straps are not readily available or are misplace, the ladder may need to be lowered from the rack while the straps are located.

In addition to the problems associated with lost or misplaced straps, another common problem is not having enough straps on hand to adequately secure the load to the vehicle. This problem is likely a result of the problem just described—lost or misplaced straps. That is, since straps are often lost, there may not be enough of them available when the time comes for them to be used. Regardless of the source of the problem, it is inconvenient to have too few straps available, and may lead to a load being inadequately secured on a vehicle.

Thus, there is a need therefore for improved apparatus for securing cargo to supports, and particularly apparatus that eliminates the problems associated with lost securing straps and not having enough straps to secure the cargo. In addition, there is a need for a securement apparatus that permits cargo to be locked in place to reduce theft of the cargo.

SUMMARY OF THE INVENTION

This invention relates to a cargo-securement apparatus and system for securing cargo of various kinds to support structures such as motor vehicle racks. The apparatus is contained within an elongate tubular member that is a component part of either the cargo or the rack. Adjustable straps that secure the cargo to the rack are components of the securement apparatus and thus are made a part of either the cargo or the rack. In a first preferred embodiment wherein the apparatus is a component of the cargo, the securing straps are carried in an elongate tubular member that is a component of the cargo. When there is a need to secure the cargo to the rack, the straps are extended out of the tubular member and are attached either directly or indirectly to the rack to securely attach the cargo to the rack. In a second preferred embodiment wherein the apparatus is a part of the rack, the securing straps are carried in an elongate tubular member that is a component of the rack. When there is a need to secure the cargo to the rack, the straps are extended out of the tubular member and are attached either directly or indirectly to the cargo to securely attach the cargo to the rack.

Accordingly, one primary object and advantage of this invention is to eliminate the problems associated with lost cargo-restraining straps by providing a cargo securing system that is a component part of the rack or the cargo itself.

Another object and advantage of this invention is to provide cargo-securing apparatus and system that has an appropriate number of cargo-restraining straps for the particular item of cargo, or alternatively for the particular type of rack.

A further object and advantage of the invention is to provide an efficient and easily used system for attaching light tools such as ladders, hand trucks, wheelbarrows and the like to support racks attached pick up trucks and roof racks for automobiles.

Still another object and advantage of the invention is to provide a cargo-securing apparatus and system that is readily adjustable to accommodate different loading situations.

Additional objects and advantages of the present invention will be apparent from the following drawings and detailed description of the invention.

DESCRIPTION OF THE PREFERRED EMBODIMENT

Figure 1:
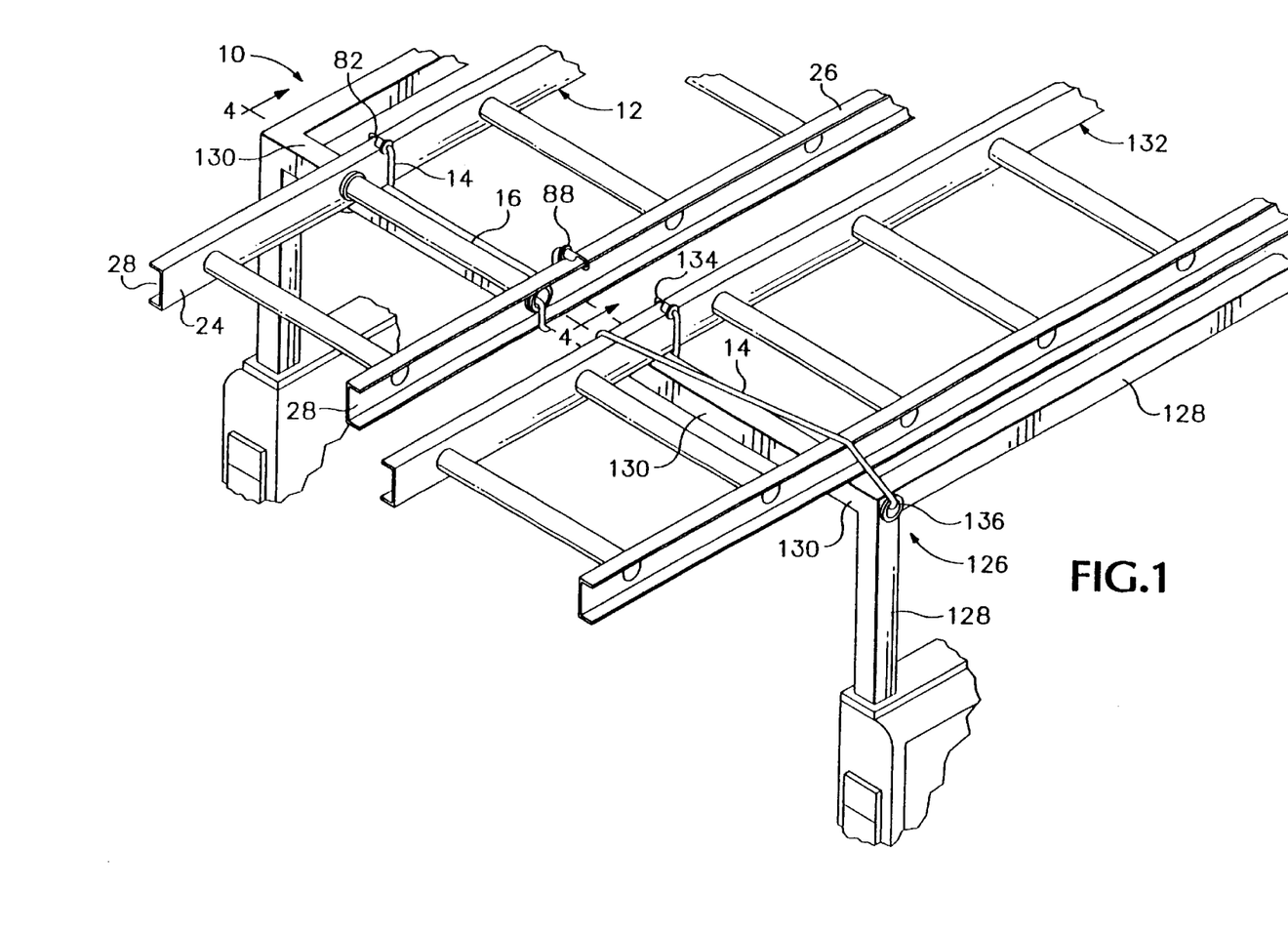
FIG. 1 is a perspective view of a preferred embodiment of the securement apparatus and system of the present invention illustrated with reference to a ladder and a pick up truck rack.

FIG. 1 illustrates a preferred embodiment of a cargo-securement apparatus and system according to the present invention. In a preferred embodiment the cargo-securement apparatus and system 10 is a component of the cargo, which in the illustration of FIG. 1 is a ladder 12. Alternatively, as illustrated in FIG. 1, the cargo-securement apparatus and system 126 may be a component of a support structure, which in the illustration of FIG. 1 is a rack 128 for a pick up truck, but which also could be a roof rack for a standard automobile or other supporting structure. As will be appreciated from the description below, the securement apparatus of the present invention is configured for securely attaching cargo such as a ladder, hand truck, wheelbarrow or other items such as scaffolding planks to a rack or other support structure. The securement apparatus may be a component of the cargo, as illustrated with ladder 12, or the apparatus may be a component of the rack or other support structure, as illustrated with rack 128.

Preferred Embodiment

Referring to the embodiment of apparatus and system 10 illustrated in FIG. 1, the securement apparatus 10 comprises an extendable strap 14 that is carried within an elongate tubular member 16 that is a component of a piece of cargo—ladder 12 in FIG. 1. The extendable strap 14 may be an elastomeric cord or may be a fabric strap, rope, wire rope, cable, chain or the like having a mechanism such as a buckle, coils or the like for permitting extension and retraction of the head end of the cord, and for applying tension to the cord. In the embodiment of FIG. 1 the elongate tubular member 16 is a rung of ladder 12. However, the present invention is not limited to ladders and the elongate tubular member may be any elongate tubular structural member of a piece of cargo. For example, the present invention is applicable to cargo such as hand trucks, wheelbarrows, scaffolding planks and other similar equipment. For reference purposes and for purposes of describing a preferred embodiment of the invention, the invention will be described with regard to ladder 12.

Figure 2:
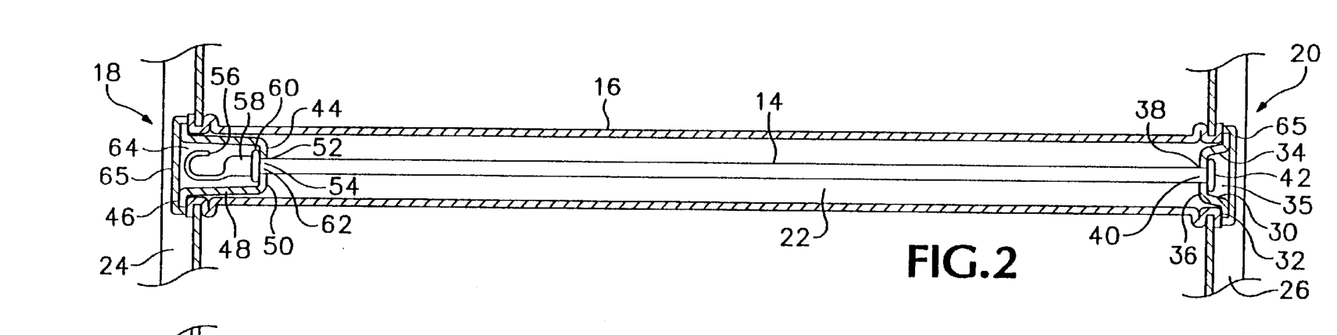
FIG. 2 is a cross sectional view of the securement apparatus of the present invention, illustrating the apparatus embodied in an elongate tubular member such as a rung of a ladder.

FIG. 2 is a cross sectional view through an elongate tubular member 16 along its longitudinal length. Elongate tubular member 16 has opposite lateral ends 18 and 20 and a passageway 22 that runs therebetween for the length of the member between the lateral ends. In the embodiment of FIG. 2, lateral ends 18 and 20 are open but covered with a removable cap 65, which is described below. Opposite lateral ends 18 and 20 are fixedly connected in well known manners such as by welding in the case of a metal ladder, or compression fitting in the case of aluminum ladders, to ladder rails 24 and 26 respectively. In the ladder illustrated in FIG. 1, rails 24 and 26 comprise elongate U-shaped members that define an elongate trough 28 that extends along the length of the rails between the opposite upright members.

As illustrated in FIG. 2, a stop 30 is fitted into lateral end 20 of tubular member 16. Stop 30 comprises a cup-shaped member having an external circumferential outwardly projecting lip 32, a sidewall portion 34 that extends inwardly from lip 32 into lateral end 20 of member 16, and a bottom wall portion 36 that at least partly occludes the passageway 22 through member 16. Stop 30 generally has the same cross sectional shape as tubular member 16 and is sized to fit into lateral end 20 such that lip 32 butts against the outer margin of lateral end 20. As detailed below, stop 30 may be attached to lateral end 20 in any suitable manner, for instance by a compression fit or by threaded attachment, or retained in position by tension on strap 14, in which case the stop is removable from the end of the tubular member. Sidewall portion 34 of stop 30 extends partly into lateral end 20 to define a recessed portion 35. A bore 38 is formed through the bottom wall portion 36 of stop 30 to allow passage of one end of strap 14 through bore 38 from the interior passageway 22. As illustrated in FIG. 2, strap 14 lies within passageway 22 such that end 40 of strap 14 passes through bore 38. Bore 38 is sized so that strap 14 can pass freely through the bore. A collar 42 is connected to end 40 of strap 14. Collar 42 may be attached to end 40 in any sufficient and well-known manner, for instance with a compression fitting. The diameter of collar 42 is greater than the diameter of bore 38 to prevent collar 42 and therefore end 40 from passing through bore 38 inward of stop 30. Collar 42 thus anchors end 40 in a fixed position.

A stop 44 is fitted into open lateral end 18 of tubular member 16. Stop 44 is shaped similarly to stop 30. Thus, stop 44 comprises a cup-shaped member having an external circumferential outwardly projecting lip 46, a sidewall portion 48 that extends inwardly from lip 46 into lateral end 18 of member 16, and a bottom wall portion 50 that at least partly occludes passageway 22 through member 16. Stop 44 generally has the same cross sectional shape as tubular member 16 and is sized to fit into lateral end 18 such that lip 46 butts against the outer margin of lateral end 18. Stop 44 is fixedly attached to lateral end 18, for instance by compression fitting or by means of attachment devices such as rivets to prevent the stop from being readily removed therefrom. A bore 52 is formed through the bottom wall portion 50 of stop 44 to allow passage of end 54 of strap 14 through bore 52 from the interior passageway 22 through member 16.

Strap 14 lies within passageway 22 such that end 54 of strap 14 passes through bore 52. A hook 56 is connected to end 54 of strap 14 outward of the bottom wall portion 50 of stop 44. Hook 56 is connected to end 54 in any of several well-known manners. Hook 56 includes a shank 58 and a collar 60 adjacent base 62 of the hook. The diameter of collar 60 is greater than the diameter of bore 52 to prevent collar 60 and therefore end 54 of strap 14 from passing through bore 52 inward of stop 44. Bore 52 is sized to allow strap 14 to move freely through the bore. An end of strap 14 that includes a hook is sometimes referred to herein as the head end of the strap.

Figure 5:
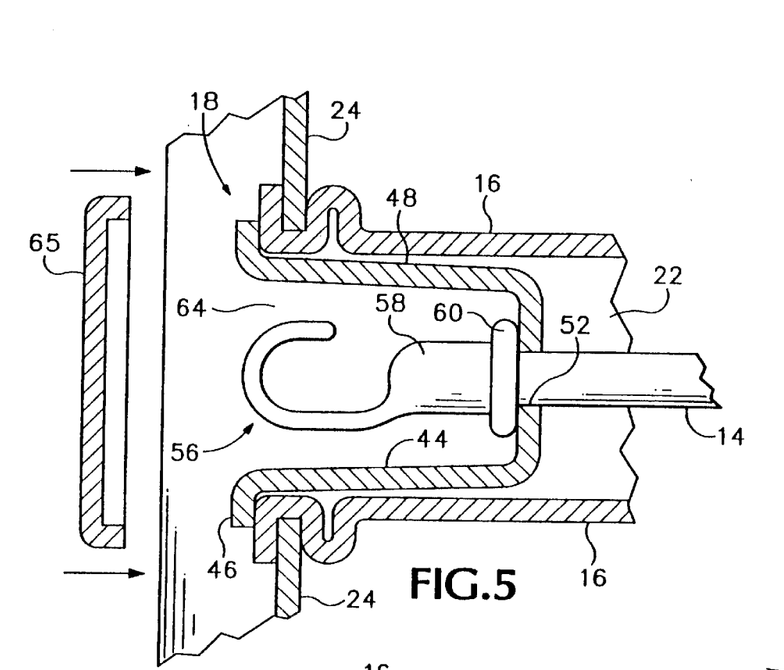
FIG. 5 is a detailed cross sectional view of the head end of the strap of the securement apparatus of the present invention shown in FIG. 2.

FIG. 5 is an enlarged detail view of end 18 of member 16 of FIG. 2. As can be seen, stop 44 is sized to be inserted into end 18 and is fixed in position by standard methods such as compression fitting or by attachment devices such as rivets or screws (not shown). The sidewall portion 48 of the cup-like stop 44 is longer than the sidewall portion 34 of stop 30 in the opposite end of member 16 (FIG. 2) to define a cup-like shape. The cup-like stop 44 defines a recessed portion 64 in the lateral end 18 of member 16. In the embodiment shown in FIGS. 2 and 5, hook 56 is completely contained within recessed portion 64 when strap 14 is in the normally retracted position shown in those figures. An end cap 65 may optionally be removably attached to the outer end of stop 44 to completely enclose recessed portion 64 when strap 14 is in the retracted position. For instance, end cap 65 may be sized to slidably fit over the outer edges of lip 46 of stop 44 in the direction of the arrows in FIG. 5. While in position over the stop, end cap 65 protects hook 56 from exposure to environmental elements. Cap 65 may be attached to the outer end of stop 44 in any appropriate manner to allow the cap to be removed and thus allow access to hook 56.

A protective cap 65 may also optionally be applied to lateral end 20 of member 16. In the case of the embodiment shown in FIG. 2, the optional cap over end 20 could be permanently attached to provide continuous protection from environmental elements. A cap placed over the end of the tubular member adjacent a head end of a strap would of course need to be removably attached to allow access to the hook device by removing the cap.

It will be appreciated that the configuration of hook 56 shown in FIGS. 2 and 5 is for illustrative purposes only and that the hook can be of any sufficient shape to provide a means for attaching the cargo to a rack. For example, the hook could be an eyelet or loop formed on the end of strap 14 or any other configuration suitable for attaching the end of the strap to another object or to itself. In some applications it would be advantageous to include a safety-locking device on the hook, for example in the manner of a locking carabiner, or some similar gated device that prevents the hook from disengaging when it is in a hooked position.

Figure 3:
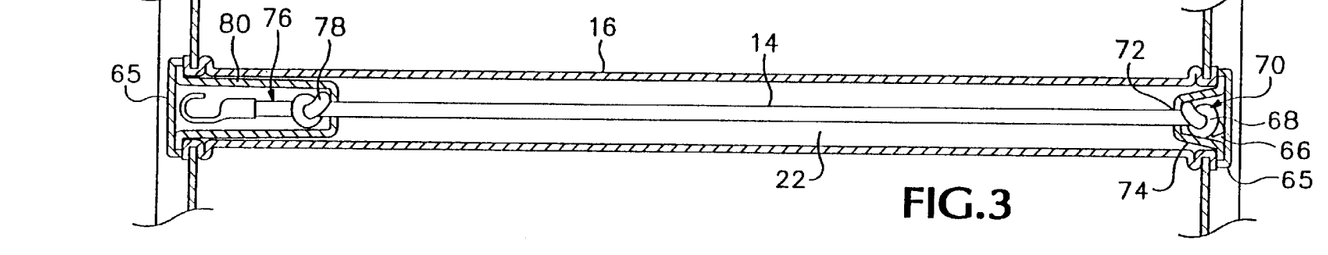
FIG. 3 is a cross sectional view similar to FIG. 2 illustrating an alternate configuration of the apparatus of the present invention embodied in an elongate tubular member such as a rung of a ladder.

In addition, the manner in which the opposite ends of strap 14 are prevented from movement past their respective stops into passageway 22 may be varied. One example of an alternate configuration for preventing inward-movement of the ends of strap 14 past their respective stops is illustrated in FIG. 3, where instead of collars 42, 60 (FIG. 2) attached to the opposite ends of strap 14, the end 66 of the strap is tied in a knot 68 to form an enlarged portion 70 in strap 14. Enlarged portion 70 is sized greater than the bore 72 through the stop 74 to prevent movement of end 66 of the strap beyond stop 74 into passageway 22. End 66 could also be doubled back on itself and fixed in place with a clip (not shown) to form an enlarged portion 70. A further alternate configuration for preventing inward-movement of an end of strap 14 that is not a head end is to attach the non-head end to the sidewall of tubular member 16 for instance with a bolt. Again referring to FIG. 3, the head end 76 of strap 14 has a knot 78 formed therein outwardly of the bore formed through stop 80. As is shown in FIG. 3, the knot 78 is larger than the opening through the bore, preventing movement of knot 78 and therefore end 76 past stop 80.

Figure 4:
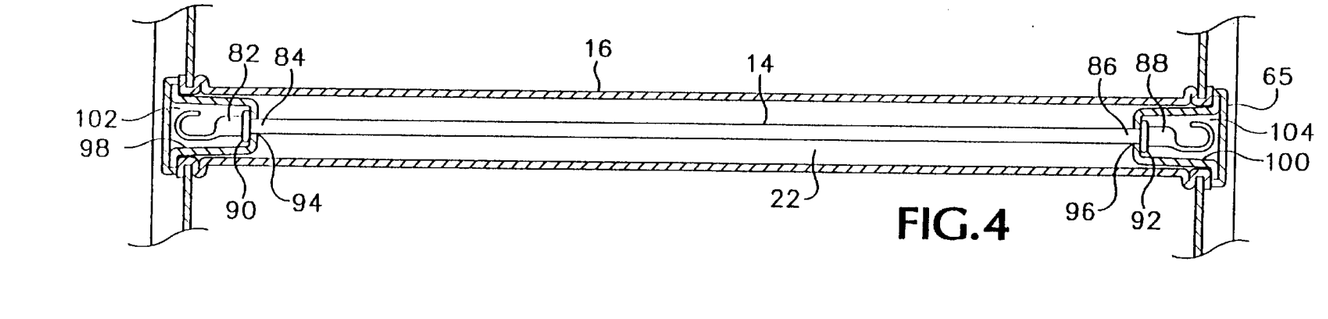
FIG. 4 is a cross sectional view similar to FIGS. 1 and 2 taken along the line 4—4 of FIG. 1, and illustrating an alternative configuration of the apparatus of the present invention.

In the alternate arrangement illustrated in FIG. 4 a hook is attached to each opposite end of strap 14. Strap 14 thus has two head ends. A first hook 82 is attached to end 84 of strap 14, and a second hook 88 is attached to opposite end 86 of strap 14. Both hooks 82 and 88 are configured similarly to hook 56 of FIG. 2 and include collars 90 and 92 that are sized larger than the bores 94, 96 through stops 98, 100, respectively. Bores 94 and 96 are sized such that strap 14 may be moved freely through the bores. Typically, the surface of the bores would be milled smooth to prevent undue wear and tear or unnecessary fraying of the strap.

A single piece of cargo may optionally contain several securement apparatuses according to the present invention. For instance, the securement apparatus illustrated in FIG. 2 may be installed in multiple rungs on a ladder. In this way the ladder may be secured to a support structure at several points along its length, thereby increasing the security of the attachment. In addition, by providing multiple attachment points the ladder may be attached to several different kinds of racks that may have support structures for attachment of the ladder in different positions. Additionally, multiple straps 14 may be installed into a single elongate tubular member 16 to provide for multiple points of attachment from a single tubular member.

Figure 10:
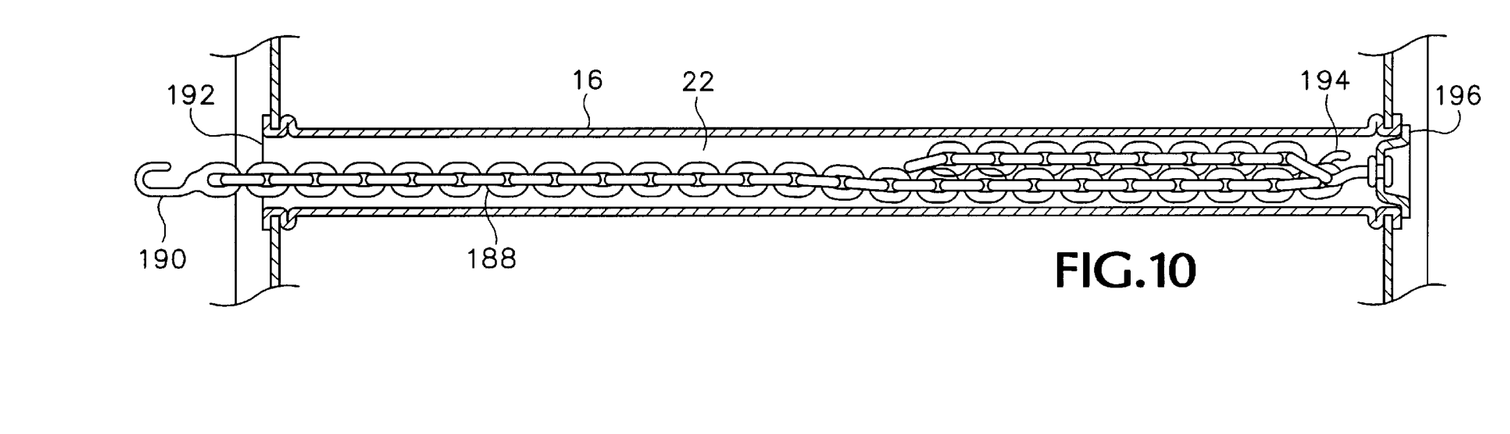
FIG. 10 is a cross sectional view of yet another alternate embodiment of the invention including apparatus for preventing theft of the tubular member.
Figure 12:
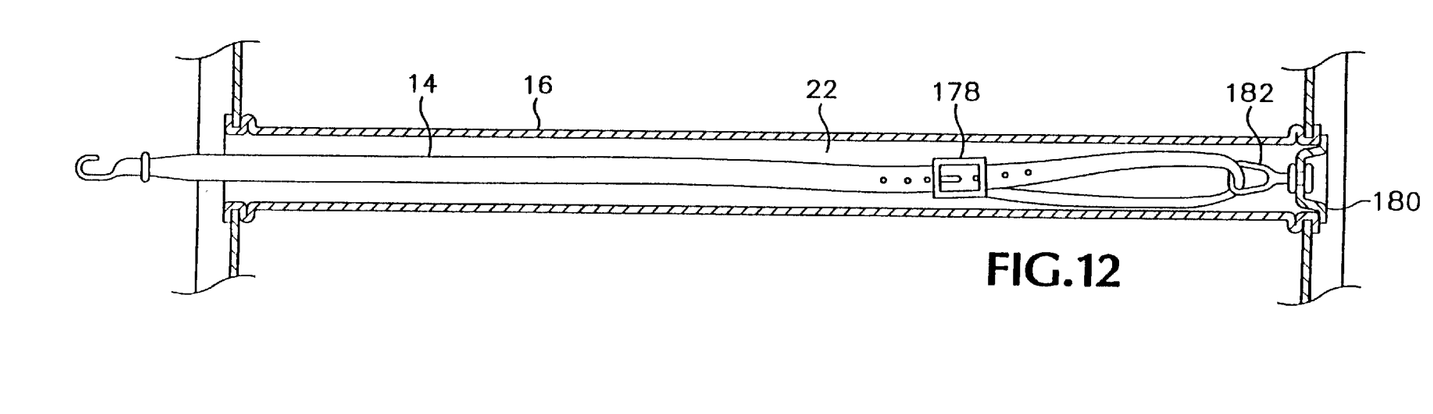
FIG. 12 is a cross sectional view of yet another alternate embodiment of the invention showing an alternate method of adjusting the strap system.

As illustrated in FIGS. 2, 3 4 and 6, in a normally retracted position strap 14 is contained within passageway 22 through member 16, with the hook contained in the recessed portion of the corresponding stop. This is the position strap 14 remains in when the securement apparatus 10 is not being used to attach cargo to a rack or other support. For instance, when a ladder incorporating the securement apparatus 10 illustrated in FIG. 1 is being used, apparatus 10 is contained within a rung of the ladder, out of the way when the ladder is in normal use. Since the hooks on the ends of strap 14, for instance hooks 82, 88 of FIG. 4, are completely contained within the respective recessed portions 102, 104 of the respective stops 98, 100, there are no obstructions on the ladder caused by the securement apparatus. In this way the securement apparatus remains out of the way when it is not needed. Alternately, the head end of the strap could extend slightly from the lateral end of the tubular member in applications where a protruding head end would not be an inconvenience, as illustrated in FIGS. 10 and 12.

When the time comes for securing the cargo to a support, for instance when the ladder is loaded in position on a pick up truck rack 128 as illustrated in FIG. 1, cap 65 is removed from the lateral end of the rung to expose the hook contained within the recessed portion of the stop. Strap 14 is then extended to an extended position where the hook or hooks on the end of the strap are attached to a support structure or wrapped around the support structure and attached to the ladder. For instance, referring to the securement apparatus shown in FIG. 4, the hook 88 would be grasped and pulled outwardly away from the ladder. Strap 14, which as noted is preferably an elastomeric material, allows hook 88 to be pulled outwardly to allow the strap to be wrapped around part of the support structure, thereby providing a point of attachment between the cargo—the ladder—and the support structure. Because collar 90 is of a greater diameter than bore 94, stop 98 serves as an anchor for the end of strap 14 that is positioned adjacent lateral end 102, while permitting hook 88 to be pulled outwardly away from the opposite end of the tube. Collar 92 performs the same function as collar 90 in the event hook 82 is first pulled outwardly away from the tube to an extended position for securing the cargo to a support. In addition, in the embodiment of FIG. 4, both head ends may be pulled outwardly to an extended position, in which case both hooks 82 and 88 may be used to secure the cargo to the support.

Again referring to FIG. 1, the strap may be wrapped around a horizontally extending cross bar 130 that is a component of rack 128, with hook 88 being connected to rail 24. Because the strap 14 is elastomeric, tension is applied to the strap, thereby securing the ladder to the rack. The securement apparatus 10 of FIG. 1 also includes a further hook 82 connected to the opposite end of strap 14. As can be seen in FIG. 1, hook 82 is pulled outwardly away from the ladder in the same manner as hook 88 and is secured around cross bar 130 in a similar manner.

The particular manner in which the hooks provide attachment between the cargo and the support structure is not important, since a secure attachment between the two may be accomplished by, for example, connecting the hooks directly to a component of the support structure. So long as there is a direct or indirect attachment between the securement apparatus and the support structure, the cargo will be held securely in place.

As noted previously, in addition to utilizing a conventional elastic cord for strap 14, other materials could be used with equal effectiveness. As examples, fabric strapping materials used in combination with adjustable buckle systems would allow the strap to lie in a normally retracted position when the apparatus is not being used to secure cargo to a support, and could be extended to an extended position when in use to secure the cargo. Such a fabric strap and buckle system is illustrated in FIG. 12, where strap 14 includes a conventional adjustable buckle 178 within the interior of tubular member 16. In this embodiment a removable stop 180 includes an inwardly projecting eyelet 182 through which strap 14 is looped. Although strap 14 is not elastomeric in this embodiment, the length that the head end of the strap may be extended out of the tubular member into an extended position for securing the tubular member to a support is adjustable by removing stop 180 from its position in the end of the tubular member and pulling the strap out of the tubular member to provide access to the buckle. The buckle may then be used to adjust the length of the strap between the buckle and the head end of the strap. The buckle system illustrated in FIG. 12 allows the length of the strap to be adjusted when the strap is in the extended position, thereby allowing tension to be applied to the strap to provide for secure attachment between cargo and support.

Figure 11:
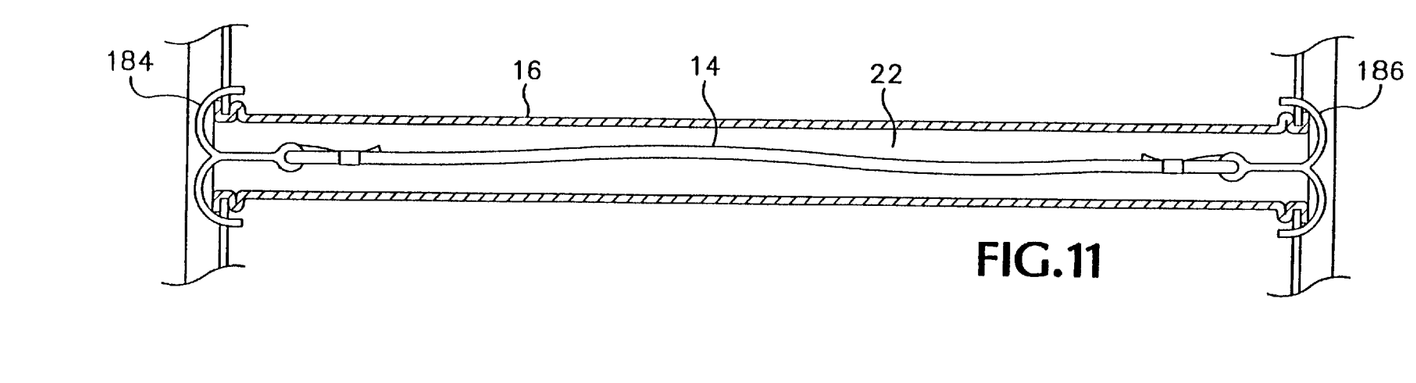
FIG. 11 is a cross sectional view of an embodiment of the present invention in an elongate tubular member such as the rung of a ladder.

The securement apparatus of the present invention may be utilized in some configurations without a stop in one end of the tubular member. For example, referring to the embodiment shown in FIG. 2, stop 44 may be eliminated completely. In that case, when strap 14 is in the normally retracted position hook 56 will lie adjacent lateral end 18 of tubular member 16 and will be easily accessible from end 18 for movement into an extended position. In addition, as shown in FIG. 11, both stops may be eliminated when one or more grappling-type hooks 184, 186 are used on opposite ends of elastomeric strap 14. The hooks function to hold the ends of the strap in place when the strap is in the retracted position, yet allow either or both head ends to be extended outwardly into extended positions by pulling the grappling-type hooks away from the tubular member.

In another embodiment that is not illustrated, the securement apparatus includes a looped strap that has both ends fixed to the tubular member at an intermediate point or points between the two opposite lateral ends of the member. The loop of the looped strap is accessible through one or both lateral ends and thus forms the head end or head ends of the apparatus as the case may be. The loop can be pulled outwardly away from the normally retracted position wherein the strap is contained within the tubular member into an extended position where, for example, the loop could be connected to a hook-like device on the support structure.

Figure 6:
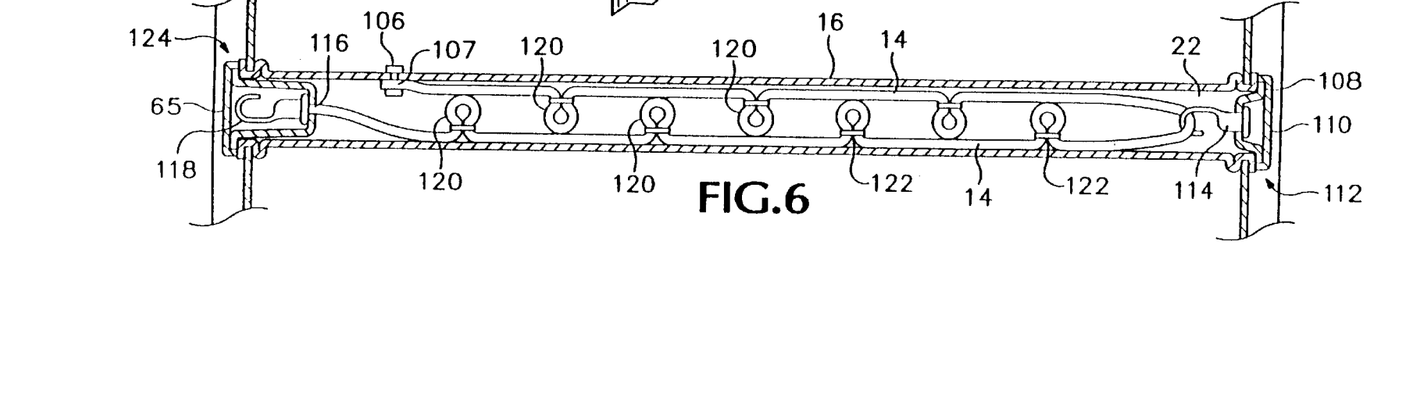
FIG. 6 is a cross sectional view of an alternate embodiment of the securement apparatus of the present invention embodied in an elongate tubular member such as a rung of a ladder, and including a system for adjusting the strap system.

One method of adjusting the distance that a head end of strap 14 may be extended away from the tubular member when in the extended position, and for varying the tension applied to strap 14 when in the extended position is shown in FIG. 6. In that embodiment a first end 107 of strap 14 is fixed to the interior wall of tubular member 16, for instance with a rivet or bolt 106. A stop 108, shown with a cap 110 is inserted into lateral end 112 of tubular member 16 such that stop 108 may readily be removed from lateral end 112. A hook 114 is attached to stop 108 such that the hook extends into passageway 22 through the interior of member 16 inward of stop 108. Strap 14 is doubled back on itself such that it extends from the attachment point at bolt 106 around hook 114 to the head end 116 of strap 14, which has a hook 118 attached thereto in a manner identical to that described above with respect to FIG. 2. Multiple loops or eyelets 120 are formed at intermediate positions in strap 14 between head end 118 and first end 107 by doubling strap 14 back on itself and securing the loop with, for example, clips 122.

In the normally retracted position shown in FIG. 6 tension is applied to strap 14, which is preferably an elastomeric material, to hold stop 108 in place on the end of tubular member 16 yet allow stop 108 to be removed from lateral end 112. The distance that the head end of strap 14 may be extended away from lateral end 124 of member 16, and the amount of tension applied to strap 14 when in an extended position, may be adjusted by connecting an eyelet 120 to hook 114. This is accomplished by removing stop 108 from its position in lateral end 112 of member 16 and pulling an intermediate section of strap 14 outwardly from passageway 22. One of the eyelets 120 is selected and connected to hook 114. Stop 108 is then allowed to return to its position in lateral end 112 and hook 118 on head end 116 of strap 14 may be pulled outwardly away from lateral end 124 to an extended position. By selecting different eyelets 120 for connection to hook 114 the distance that hook 118 may be extended outwardly from lateral end 124 may be adjusted, as may the amount of tension applied on strap 14 when it is in an extended position.

Figure 7:
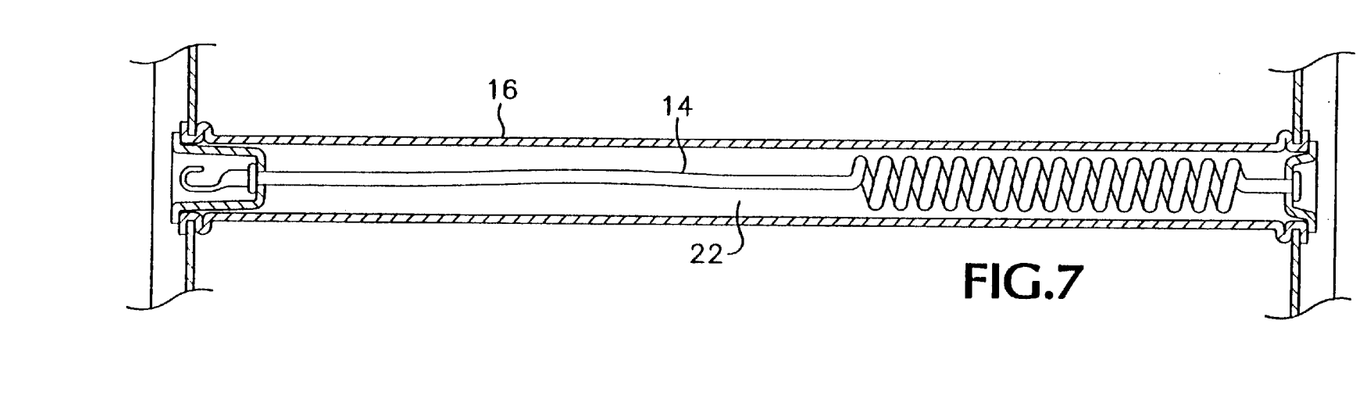
FIG. 7 is a cross sectional view of an alternate embodiment of the securement apparatus of the present invention embodied in an elongate tubular member such as a rung of a ladder.

Another method of adjusting the distance that head end of strap 14 may be extended is shown in FIG. 7. FIG. 7 is similar to the embodiment shown in FIG. 2 except a section of strap 14 is coiled within passageway 22 to provide added strap material. This allows the head end of the strap to be extended outwardly away from the tubular member a greater distance than embodiments without such coiling.

Additionally, the securement apparatus of the present invention may be installed in cargo items as a retrofit unit. In other words, the apparatus need not be built into the cargo device as an original item of manufacture and instead could be installed at any time. As an option for retrofitting a securement apparatus, the apparatus may be constructed in a pre-made tubular member that is sized to fit within an existing tubular member on a cargo device. As one example, the securement apparatus shown in FIG. 2 could be assembled in a pre-made tubular member that is sized to be inserted into one end of tubular member 16 and fixed in position in the passageway 22 therethrough. Although not shown in the drawings, it will be appreciated that in this case there would be a double-walled tubular member when the apparatus is inserted into passageway 22. A second retrofit option is to construct the apparatus in a pre-made tubular member that is sized to connect to a tool such as a ladder but not such that the pre-made member inserts within a tube on the ladder. For example, a pre-made tubular member incorporating the present invention may be sized for connection to a ladder having solid rungs such as a wooden ladder.

In addition, although the illustrations show tubular members that are straight, the securement apparatus of the present invention will work in curved tubular members and flexible members. It will be appreciated that the stops 30 and 44 (FIG. 2) function to fix the respective ends of strap 14 relative to the lateral ends of tubular member 16 yet allow strap 14 to be extended into extended positions where the strap is used to secure the cargo to the support, and that other stop devices could be utilized to accomplish the same function. As one example, in the embodiment illustrated in FIG. 2, end 40 of strap 14 could be bolted or similarly attached to the interior of tube 16.

Alternate Embodiments

The embodiment of the securement apparatus of the present invention shown in FIG. 1 illustrates the situation where the securement apparatus 126 is a component of the support structure, which in the illustration of FIG. 1 is a pick up truck rack 128. The securement apparatus itself is contained within a horizontal cross bar 130 that is a component of the rack and which comprises an elongate tubular member. It will be appreciated that each of the different configurations and embodiments discussed above and illustrated in FIGS. 1 through 6 apply equally to securement apparatus 126. In addition, multiple securement apparatuses may be installed in multiple elongate tubular members in any one support structure to provide for multiple points of attachment to various cargo devices.

With the securement apparatus 126 of FIG. 1, the cargo such as a ladder is placed onto the support structure and secured in place in a manner similar to that described above with respect to a ladder that includes the securement apparatus. For example, in FIG. 1 ladder 132 is secured to horizontal cross bar 130 of rack 128 by pulling a hook 134 outwardly from a lateral end 136 of the elongate tubular member, which in the illustration of FIG. 1 comprises horizontal cross bar 130. Hook 134 is pulled outwardly from lateral end 136 to an extended position and is connected to either the rack or the ladder such that strap 14 secures the ladder to the rack.

Figure 8:
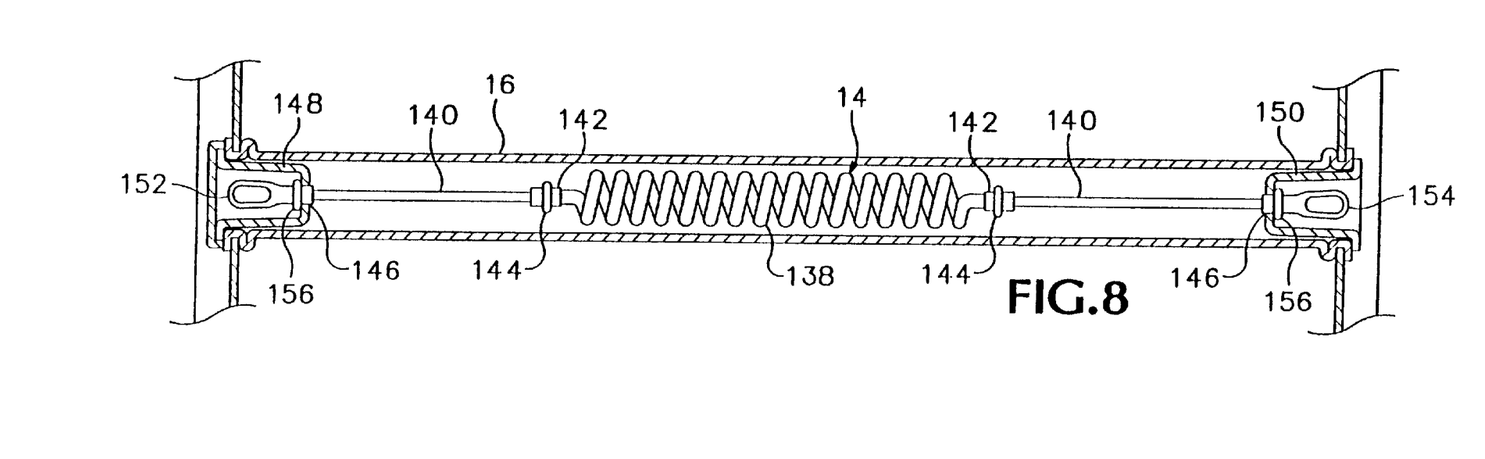
FIG. 8 is a cross sectional view of another alternate embodiment of the present invention embodied in an elongate tubular member such as a rung of a ladder, and including apparatus for preventing theft of the tubular member.

Another alternate embodiment of the present invention is illustrated in FIG. 8. In this embodiment, the strap includes a segment that is elastic and a segment that is a material that not easily cut, is not extendable and nonelastic, such as wire cable. In addition to this embodiment being useful for securing cargo to a support structure, this embodiment is useful as a security device for locking cargo to support structures. Thus, as described below the wire cable segment may be extended outwardly away from the tubular member but the elastic portion of the strap, which could be cut, remains enclosed within the tubular member. In the illustration of FIG. 8, the strap comprises a coiled section of elastomeric material 138 that is sandwiched between two sections of wire cable 140. The wire cable is preferably a high quality type such as stainless steel that is resistant to cutting. The opposite ends of elastomeric material 138 are connected to the innermost ends of the cables 140 with suitable connectors such as a compression shanks 142 within the interior of passageway 22. Shanks 142 each include a collar 144 having a diameter greater than the diameter of bore 146 through stops 148 and 150, respectively. The outer ends of cables 140 pass through the bores 146 and eyelet-type hooks 152 and 154 are attached to the outer ends of the two sections of steel cable 140 outward of the respective stops 148, 150. Collars 156 positioned between the eyelet-type hooks and the stops are sized greater than the bores to prevent movement of the hooks through the bores and into passageway 22 inward of the stops.

In the retracted position shown in FIG. 8 the coiled section of elastomeric material 138 applies tension on the entire strap, pulling the eyelet-type hooks connected to the outer opposite ends of the strap inwardly toward the center of passageway 22. In this position the strap pulls the head ends of the strap inwardly toward the center of passageway 22 until collars 156 abut the respective stops and are thus prevented from moving past the stops in the direction toward the center of passageway 22. Either one or both of eyelet-type hooks 152 and 154 may be grasped and pulled outwardly away from tubular member 16 into an extended position. For example, hook 152 may be pulled outwardly until collar 144 on shank 142 abuts and engages stop 148. The exposed section of steel cable 140 may then be looped around a support structure and locked in place with, for instance, a padlock. Because collar 144 limits the distance the steel cable may pulled outwardly, only steel cable, which is difficult to cut, is exposed outside of the tubular member, and the elastomeric section of strap 14 remains enclosed within tubular member 16 where it cannot be cut. This is an advantageous security feature that helps prevent theft. Similarly, hook 154 may be pulled outwardly either in concert with hook 152 or by itself in the same manner as just described.

Figure 9:
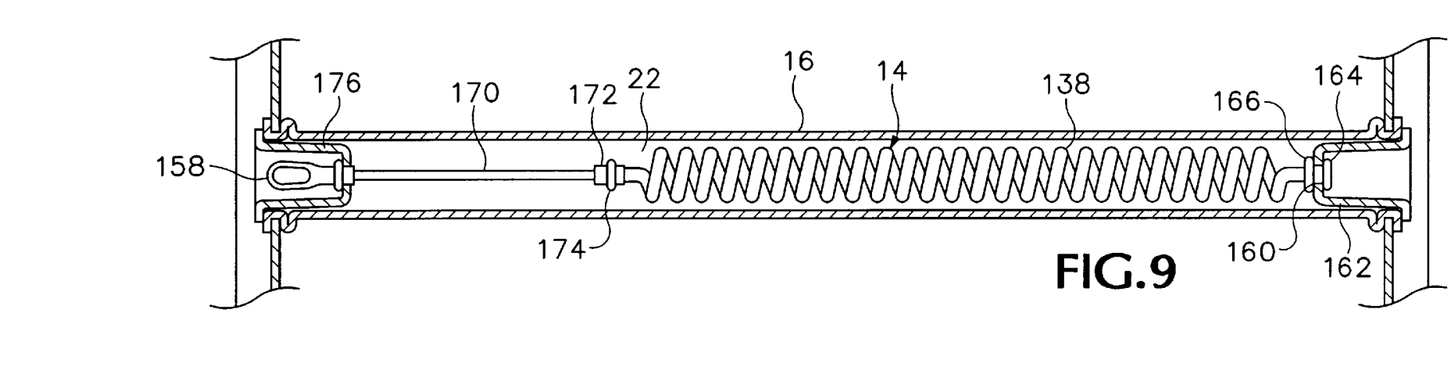
FIG. 9 is a cross sectional view of another alternate embodiment of the embodiment of FIG. 8, illustrating the invention embodied in an elongate tubular member such as a rung of a ladder.

FIG. 9 shows a further example of a locking-type securement apparatus of the present invention. This embodiment, which is analogous to the embodiment shown in FIG. 2 has only one head end. That is, only one eyelet-type hook 158 is used. A first end 160 of strap 14 is anchored to a stop 162 with paired collars 164, 166 positioned one on each side of the bore through the stop, fixing end 160 in place. The opposite end of strap 14 is connected to a wire cable section 170 as discussed above with reference to FIG. 8. A shank 172 with a collar 174 allows hook 158 to be extended outwardly from tubular member 16 but the distance the hook may be extended is limited by the collar 174. Thus, hook 158 may be extended outwardly only until collar 174 engages stop 176, thereby providing an extended position in which only wire cable is exposed for locking the tubular member to a support.

Another alternate embodiment that is useful for locking cargo to a support structure is illustrated in FIG. 10, wherein a chain 188 replaces strap 14. The distance that hook 190 extends outward of the end 192 of tubular member 16 is adjusted by selecting a link of chain 188 to attach to an inwardly projecting hook 194 in removable stop 196.

Figure 13:
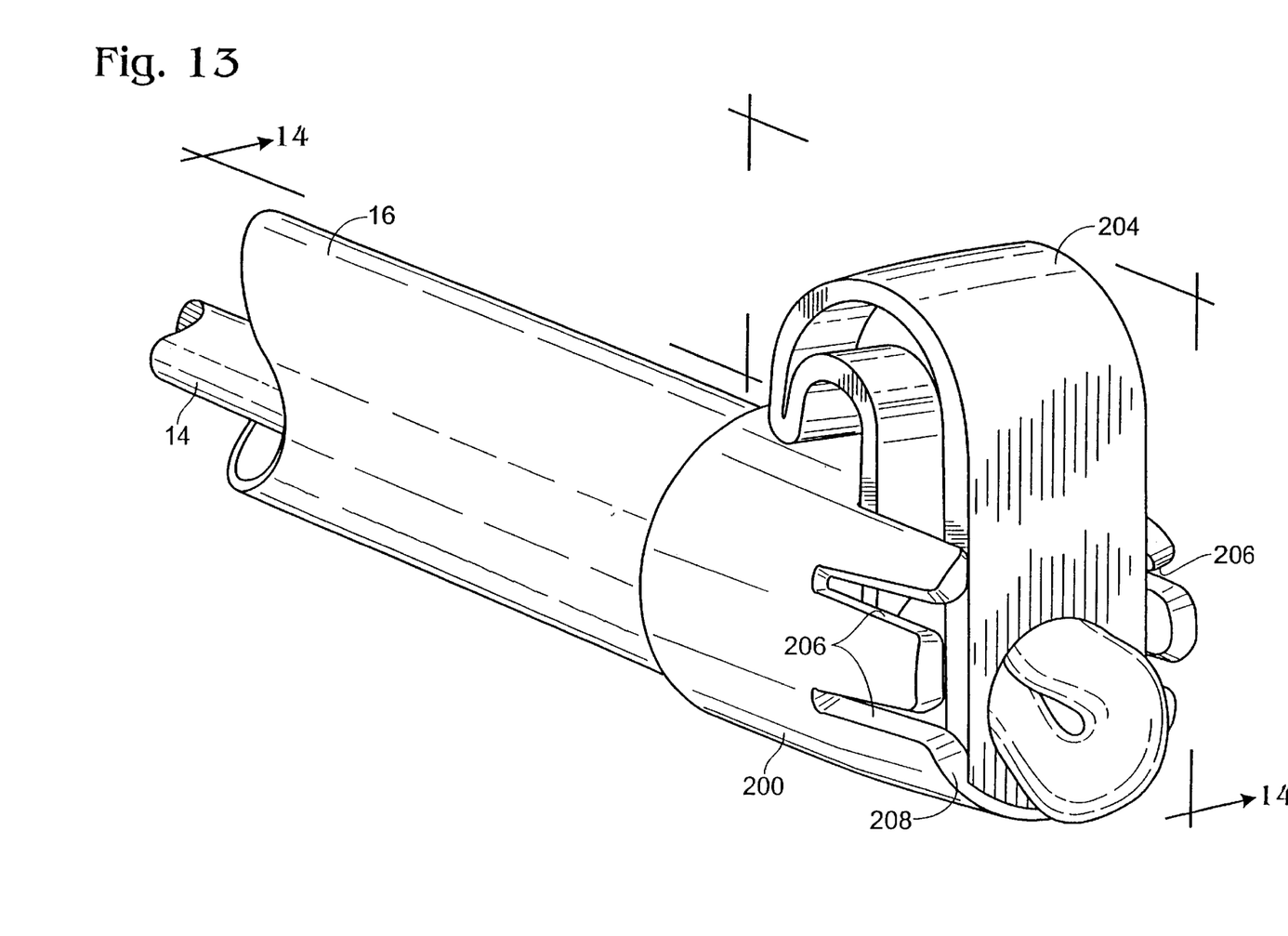
FIG. 13 is a perspective view of yet another alternate embodiment of the present invention that is particularly suited for use with vehicle racks.
Figure 14:
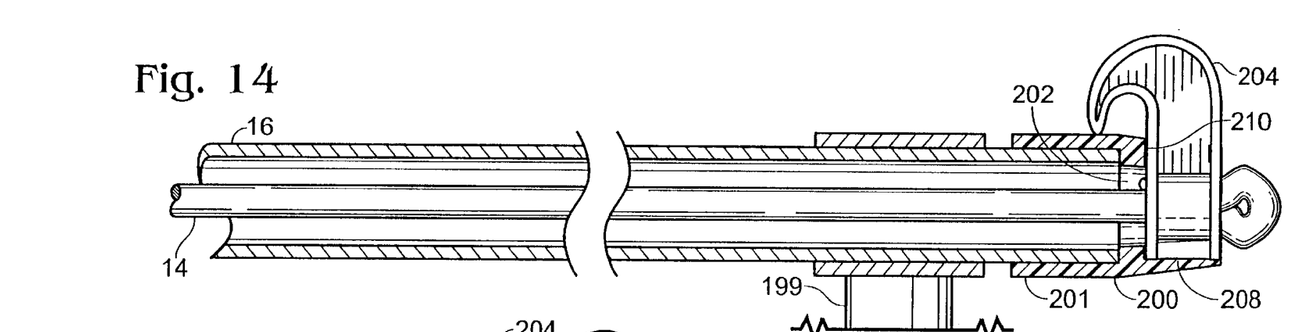
FIG. 14 is a cross sectional view of the embodiment shown in FIG. 13, taken along the line 14—14 of FIG. 13, with the extendable strap shown in the retracted position.
Figure 15:
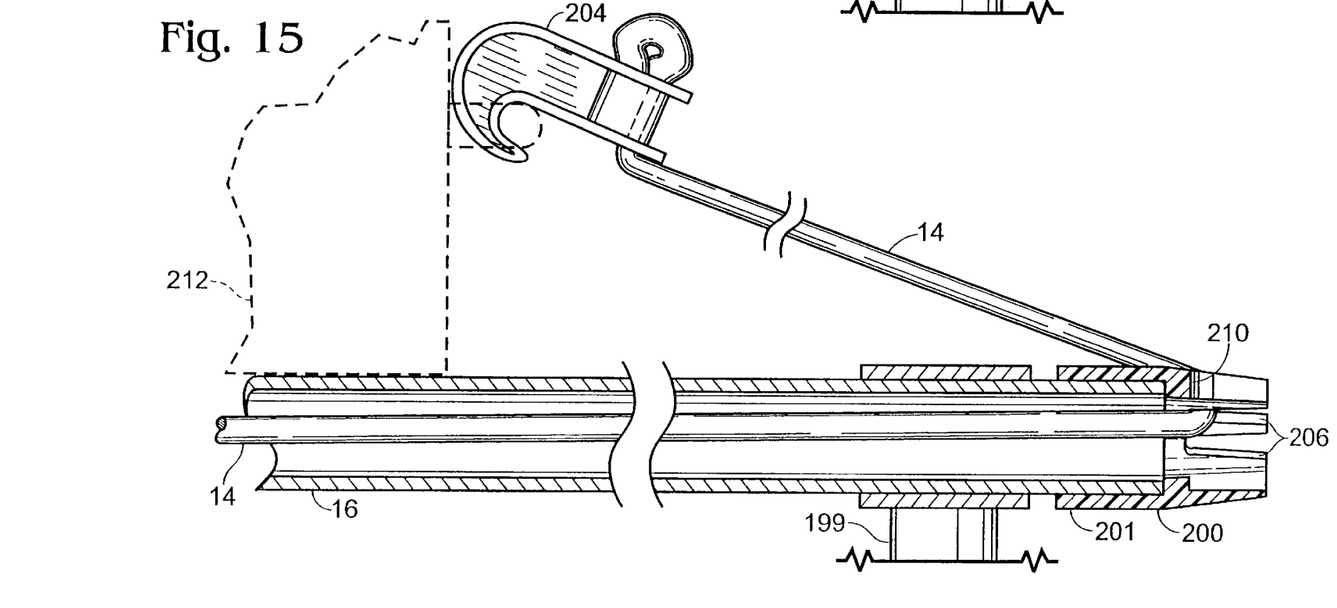
FIG. 15 is a cross sectional view of the embodiment shown in FIG. 13, taken along the line 14—14 of FIG. 13, with the extendable strap shown in an extended position.

Yet another embodiment of the present invention is illustrated in FIGS. 13 through 15. This embodiment of the invention is particularly well-suited for use with automobile rooftop racks where the securement system is a part of the rack. The securement system may be included with the rack as an original equipment manufacturer's product or as a retrofit product for any given model of rooftop rack. For instance, in FIGS. 14 and 15 the embodiment of FIGS. 13 through 15 is shown as part of a typical roof rack for a vehicle that includes support posts 199, which typically rest on the vehicle's roof. The present embodiment may also be incorporated into, for example, a bicycle rack that is designed for the back or a car, or a motorcycle rack and the like. In such racks the tubular member into which the cord is inserted is typically curved rather than linear.

Only one end of tubular member 16 is shown in FIG. 13. Tubular member 16 is typically a cross bar that is part of a rooftop rack for a vehicle. Although most roof racks have cross bars that are straight, the tubular member could be curved. Strap 14, which typically is a bungee-type elastic cord is shown extending axially through the hollow center of the tubular member with one end of the strap extending through an end cap or bracket 200 that is adapted to fit over the lateral end of member 16. The particular size and shape of bracket 200 used in any particular situation depends upon the cross sectional configuration of the tubular structural member 16 with which the securement system is being used. For example, tubular member 16 in FIG. 13 is circular in cross section. Accordingly, bracket 200, which is attached to the lateral end of member 16, is of like configuration. However, when structural member 16 is, for example, square in cross section, an end cap having a square cross sectional configuration is used. Moreover, the particular shape of the bracket is not dependent upon the cross sectional configuration of the tubular member. For example, a round bracket such as that illustrated in FIG. 13 could be configured for use with a tubular member having a square cross section.

With reference to FIG. 14, bracket 200 has a bore 202 formed therethrough. Bracket 200 is adapted to engage and fit over or into the lateral end of the tubular member with bore 202 communicating with the interior of the tubular member. The bracket may be attached to the end of the tubular member in any well-known manner, for instance with a pressure fit collar that engages the tubular member either internally or externally, or both, or with an appropriately shaped and sized annular groove formed in the bracket, or with a threaded base that is threaded into a cooperatively threaded portion of the tubular member. In FIG. 14 bracket 200 is shown attached to the lateral end of the tubular member 16 with an annular sleeve 201 that has an interior diameter that is substantially the same as the exterior diameter of the tubular member. As such, the sleeve 201 slides onto the tubular member and is held in place by friction. If desired, bracket 200 may be secured in place on the end of the tubular member with a screw extending through sleeve 201 and tubular member 16.

Alternatively, bracket 200 may be inset into the lateral end of tubular member 16 as shown in FIG. 4, in which case the hook member could be contained in a recessed portion as previously described.

As noted, a bore 202 extends through bracket 200 and when bracket 200 is connected to the tubular member the bore communicates with the hollow interior of the tubular structural member. As detailed below, the end of cord 14 extends from the interior of tubular member 16 through bore 202 in bracket 200 and through a bore formed in a hook 204. The outer end of cord 14 is folded over onto itself and crimped to define an enlarged cord section that prevents the end of the cord from passing back through the bore through the hook.

One or more V-shaped notches 206 are formed around the periphery of bracket 200 in an outwardly projecting flange 208. The bracket shown in FIG. 13 has four V-shaped notches 206, two each positioned on opposite sides of the bracket in flange 208. The number and positions of the V-shaped notches is not critical. As described below, each notch 206 is sized to receive and anchor cord 14 when it is in an extended position to allow a selected tension to be applied to hook. The notches are thus sized according to the size of cord 14 that will typically be used in the system. While a single sized V-shaped notch will anchor multiple sizes of cord, when for instance a very large cord is being used, a relatively larger V-shaped notch may be used. The inner-facing surfaces of the V-shaped notches may be smooth or may be modified to provide more frictional resistance between the cord and the bracket. For instance, the inner-facing surfaces may be roughened or grooved. In addition, the notches may be any shape configured for engaging the cord to supply a means for applying a selected amount of tension to an item of cargo. Thus, a mechanical cam or cam cleat could be used rather than notches to engage the cord as a method of selectively and variably applying tension to the cord. When the bracket is inset into the tubular member the notches or other cord-engaging members may be placed around the periphery of the opening into the tubular member or contained within the recessed portion of the member.

The portion of bracket 200 located radially inward of flange 208 defines a seat 210 configured for receiving hook 204 when cord 14 is in the retracted position shown in FIGS. 13 and 14. When the cord is in the retracted position there is a nominal tension applied to cord 14, enough so that hook 204 is held in place, seated in bracket 200. Seat 210 comprises a flattened central portion in bracket 200 with a flattened shoulder that extends completely around bore 202 to thereby provide a secure nesting or seating orientation of hook 204 in bracket 200 when the cord is in the retracted position. Because hook 204 is sized such that it rests on seat 210 and cannot be pulled inwardly through bore 202, the bracket acts as a stop to prevent the hook from moving past the bracket into the tubular member. Although not shown, a retaining clip may be added to bracket 200 for clipping hook 204 securely in position on the bracket, for instance, for retaining the hook in a secure position on the tubular member. This is desirable when for example a car having the securement system attached to a rack is taken through an automated car wash.

As shown in FIG. 15, hook 204 may be extended outwardly away from its seated position in bracket 200 by pulling the hook outwardly, stretching cord 14. Cord 14 may then be laterally inserted at a selected position into a selected one of the V-shaped notches 206 in bracket 200. The V-shaped notch 206 (or other means for engaging the cord) functions as an anchor point or pinch point for engaging the cord and fixing it at a selected position relative to the bracket. The cord is inserted laterally into the notch and is pulled to securely anchor the cord, thereby pinching the cord in the V-shaped notch. Once the cord is inserted into and correctly anchored in the notch it will stay anchored in the notch until it is intentionally pulled out of engagement. The point at which cord 14 is anchored in a notch 206 is selected by consideration of the distance from the notch to the item of cargo to be secured to the tubular member, and by the amount of tension desired on cord 14. With reference to FIG. 15, with cord 14 anchored at the desired position in a slot 206 of bracket 200, hook 204 is pulled away from the bracket by stretching cord 14 into an extended position. Hook 204 may then be attached either directly or indirectly to an item of cargo such as cargo 212, which in FIG. 15 is shown in phantom lines.

Variable selected amounts of tension may be applied to cord 14, as seen in FIG. 15 where the diameter of cord 14 inwardly of the point where it is engaged in notch 206 (i.e., within tubular member 16) is relatively larger than the diameter of cord 14 outwardly of notch 206, where a relatively higher tension is being applied to the cord. As tension is applied to the cord by pulling on hook 204, the cord remains anchored in the V-shaped notch. This allows the hook to be pulled under tension to a desired position and attached either directly to an item of cargo, or indirectly to cargo and other parts of, for instance, a vehicle and/or the rack. The V-shaped notches allow for a high degree of flexibility in the length of cord that is extended outwardly from the tubular member, and thus flexibility in selectively adjusting the amount of tension that is applied to the cord and the hook attached to the outer end of the cord. The V-shaped notches (or other equivalent means for engaging the cord) thus serve as means for applying a selected and desired amount of tension on the cord and thus to an item of cargo carried on the rack or other device with which the apparatus is used.

It will be appreciated that while only one end of tubular member 16 is shown in FIGS. 13 through 15, the opposite end of member 16 could be fitted with an identical arrangement of a bracket and a hook. Moreover, while bracket 200 is shown and described as a separate component that connects to the outer lateral end of tubular member 16, the outer end of member 16 could be formed in a unitary piece to include an integral bracket having cord-engaging notches and a seat for receiving a hook when the cord is in a retracted position.

The embodiment illustrated in FIGS. 13 through 15 may also be used in connection with a tubular member that is incorporated into, for example a car's trunk or the storage compartment of a sport utility vehicle. In this instance the tubular member is attached to a wall section of the trunk or storage compartment, either behind the wall section or on the exterior. One or both ends of the tubular member are accessible so that the hook may be extended away from its seated position when the strap is in the retracted position, engaged in a selected position in a V-shaped notch and used to secure cargo in the trunk or storage compartment.

As noted above, the invention could likewise be incorporated into a cargo item, such as a cooler or cargo box and the like, in which case the tubular member could extend around the periphery of the cargo. In the case of a cooler or cargo box, the tubular member extends around a periphery of the cooler or cargo box.

With repeated use, standard elastic cords can lose some of their original elasticity, and as a result, the original resting length of the cord is lengthened. In such cases it is possible for a hook attached to the end of the cord to not be seated against the bracket. This problem is easily remedied by shortening the length of the elastic cord or by replacing the cord. Therefore, another means of adjusting the tension on the cord and thus the tension applied to an item of cargo when the hook is connected to cargo is to simply adjust the length of the cord.

Similarly, the invention contemplates an opening in the tubular member at an intermediate point between the two lateral of the member through which the cord is accessible. In this case a tie down member is connected to the cord at a point between the two ends of the cord and the cord and tie down member is pulled outwardly, engaged at a selected position in a V-shaped notch and is attached to cargo. This may be combined with tie down members on one or both lateral ends of the tubular member.

Figure 17:
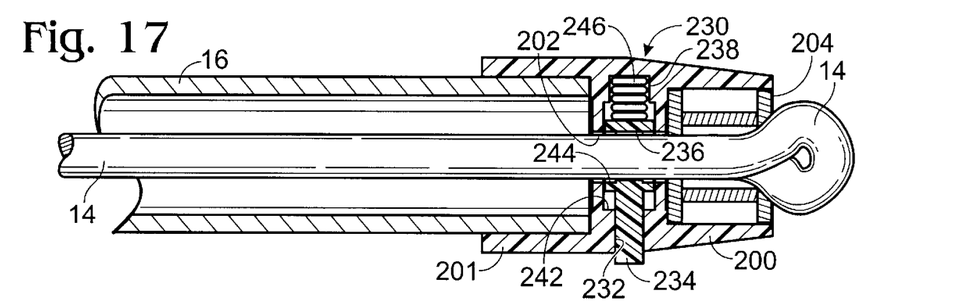
FIG. 17 is a cross sectional view taken along the line 17—17 of FIG. 16, with the cord clasping mechanism shown in the open position.
Figure 18:
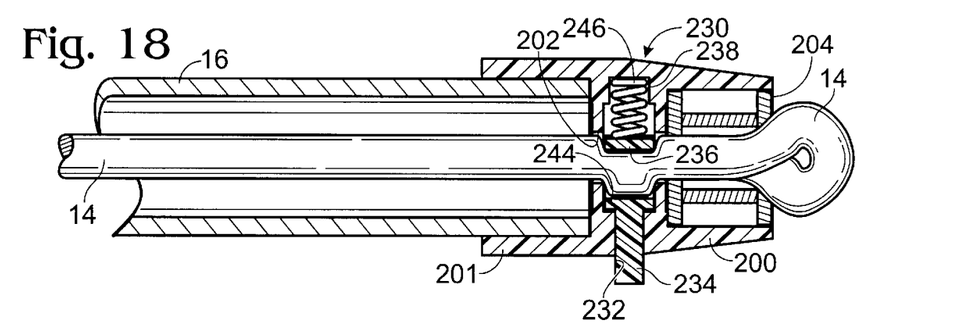
FIG. 18 is a cross sectional view identical to the view shown in FIG. 17 except the cord clasping mechanism shown in the closed position.
Figure 19:
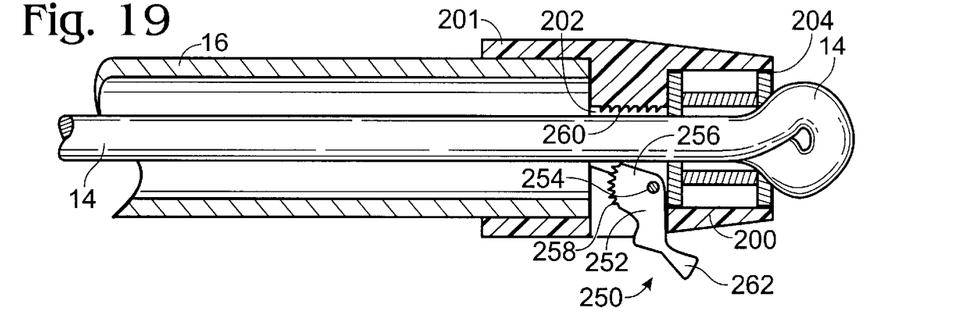
FIG. 19 is a cross sectional view similar to the view shown in FIG. 17 but showing a cam wheel locking mechanism for clasping the cord, with the cam wheel in the open position.
Figure 20:
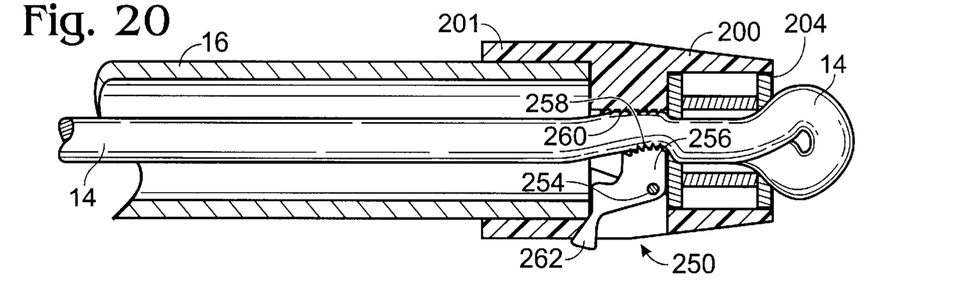
FIG. 20 is a cross sectional view identical to the view shown in FIG. 19 except the cam wheel locking mechanism is shown in the closed position.

Two alternative mechanisms to the V-shaped notches for facilitating adjustable tension on the cord and cord length are shown in FIGS. 16 through 20. More specifically, in FIGS. 16 through 18 the mechanism comprises a spring-loaded push button device that selectively secures the cord or releases it. The mechanism in FIGS. 19 and 20 is a cam locking mechanism for securing or releasing the cord. Each will be described below.

Figure 16:
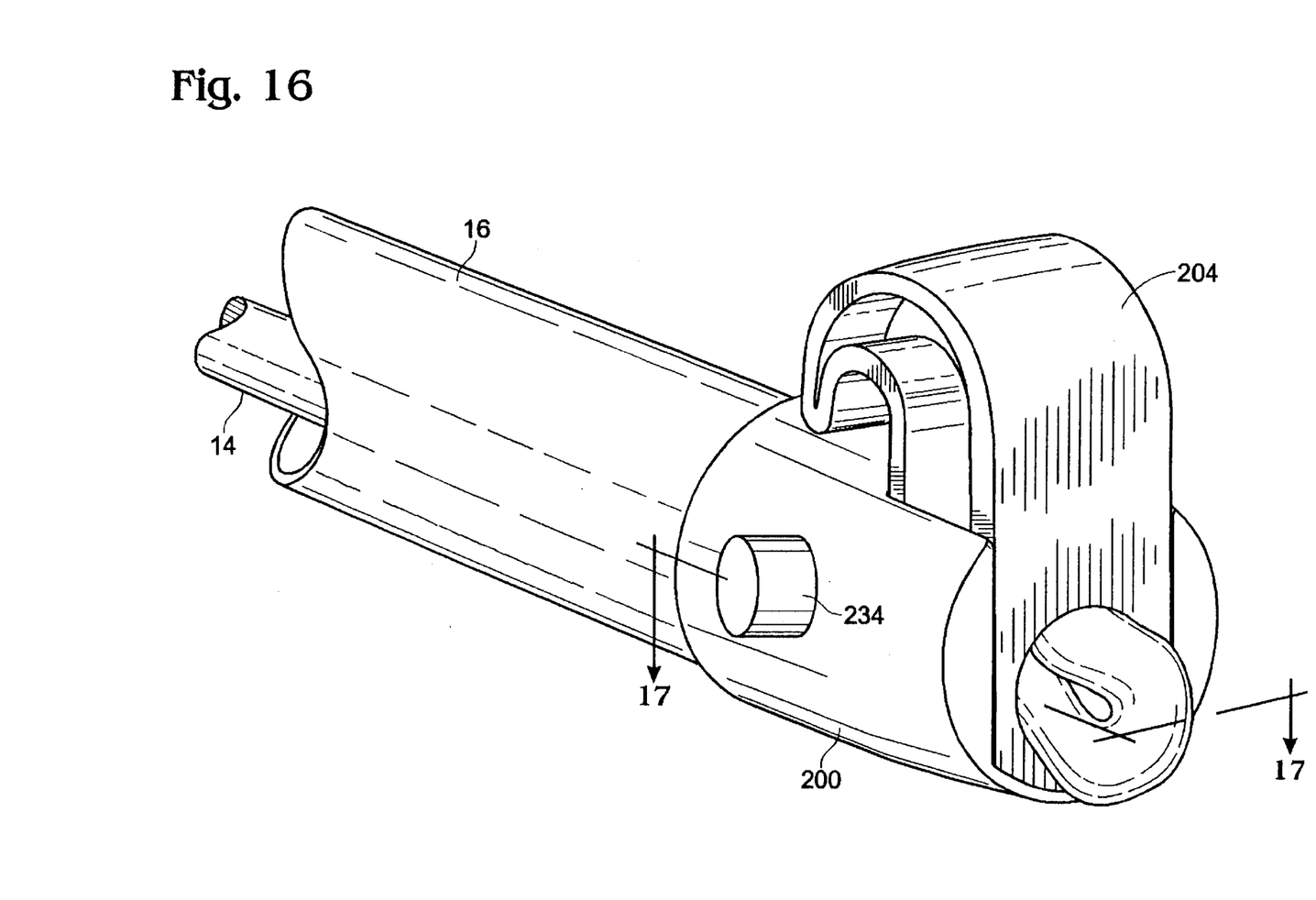
FIG. 16 is a perspective view of an alternative embodiment of a roof rack end cap according to the present invention.

With reference to FIG. 16, bracket 200 has a bore formed therethrough in communication with the interior passageway through tubular member 16. As with prior embodiments, bracket 200 is adapted to engage and fit over or into the lateral end of the tubular member with bore 202 (FIG. 17) communicating with the interior of the tubular member. In FIG. 17 bracket 200 is shown attached to the lateral end of the tubular member 16 with an annular sleeve 201 that has an interior diameter that is substantially the same as the exterior diameter of the tubular member. As such, the sleeve 201 slides onto the tubular member and is held in place by friction. If desired, bracket 200 may be secured in place on the end of the tubular member with a screw extending through sleeve 201 and tubular member 16. It should be noted that as with prior embodiments the features of the embodiments shown in FIGS. 16 through 20 need not be limited to the ends of the tubular member, but are easily adapted to allow the cord to be pulled out of the tubular member from an opening intermediate along the length of the tube.

Referring again to FIG. 16 it may be seen that bracket 200 lacks the notches 206. In their place, the embodiment of FIG. 16 uses a push button mechanism 230 that selectively engages and disengages cord 14 to allow it and hook 204 to be moved into and out of member 16, and to vary the amount of tension on the cord and thus to hook 204. With reference to FIG. 17, mechanism 230 comprises a bore 232 that extends through the side of bracket 200 transverse to the longitudinal axis defined by cord 14 (in FIG. 17). A rod 234 is slidably received in bore 232 and extends through the bore and across bore 202. Rod 234 has an opening 236 through which cord 14 extends. The distal end of rod 234 extends beyond bore 202 and into a bore 238 on the opposite side of bracket 200 that is aligned with bore 232. Bore 232 defines an oversized shoulder 242 within the bracket, and an oversize flange 244 on rod 234 butts against shoulder 242 to prevent rod 234 from sliding out of the bore. A spring 246 seated in bore 238 applies pressure to rod 234 at the distal end of the rod.

In the relaxed, normally closed position shown in FIG. 18, spring 246 pushes rod 234 through bore 232 such that the opening 236 through rod 234 is offset from and misaligned with bore 202. In this position, cord 14 follows a serpentine path and is crimped and compressed between the edges of bracket 200 that define bore 202 and the edges of rod 234 that define opening 236. This crimping engagement of cord 14 prevents the cord from moving relative to bracket 200, thus retaining hook 204 firmly seated in the end of bracket 200.

Mechanism 230 can be opened to allow hook 204 to be moved outwardly by pushing rod 234 inwardly against the biasing pressure of spring 246, as shown in FIG. 17, where spring 246 is compressed. In this position, opening 236 aligns with bore 202 and cord 14 is free to move through the thus open passageway formed through bracket 200. Hook 204 may thus be moved both outwardly away from bracket 200, and inwardly toward bracket 200 when mechanism 230 is in the open position shown in FIG. 17. As an example, with the mechanism 230 in the position of FIG. 17, hook 204 may be pulled outwardly away from bracket 200. This causes cord 14 to move longitudinally through the bracket and the mechanism 230. When the desired length of cord has been extracted in this manner, the pressure on rod 234 is released and the mechanism moves back to the position of FIG. 18, locking the cord in that position.

Referring now to FIGS. 19 and 20 the mechanism for facilitating adjustable tension on the cord comprises a cam mechanism 250 having an eccentric cam 252 pivotally mounted on a rod 254 that has its opposite ends fixed in the body of bracket 200. Rod 254 extends through cam 252 in a position to define an eccentric portion 256 of the cam. The cam includes ribbed protrusions or teeth 258. Bore 202 through bracket 200 likewise includes ribbed protrusions 260 opposite the position of cam 252. Although not shown, cam 252 may include a spring such as a torsion type spring to normally bias the cam into the locked position shown in FIG. 20. The open or unlocked position is shown in FIG. 19. In this position cord 14, which extends through bore 202, is free to move through the bore. This allows hook 204 to be moved away from, or toward bracket 200.

Cam mechanism 250 can be moved into the locked position shown in FIG. 20 to lock cord 14 between the teeth 258 on the eccentric portion 256 of cam 252, and teeth 260 on bore 202 by rotating the cam 252 about rod 254. This exerts a pinching or compressing pressure on the cord and locks it in place with substantial holding power. The cam mechanism is released by pivoting the cam back to the unlock position of FIG. 19 with, for example, a thumb lug 262. Although cam mechanism 250 is shown in a preferred embodiment in which the mechanism is supported by bracket 200, tubular member 16 may support the cam itself.

Both of the mechanisms 230 and 250 may be modified to accommodate multiple cords 14 extending through member 16, as for example with multiple cams or multiple push button release mechanisms. Moreover, when dual or more cams are used in a bracket the cams may be oriented such that they lock in opposing directions. Also, the mechanisms may be adapted to accommodate cords having any cross sectional configuration, including the round cord shown in the figures and other cords such as flat cords. Further, either mechanism may be positioned in a tube member anywhere along its length and intermediate between the ends.

While the present invention has been described in accordance with preferred embodiments, it is to be understood that certain substitutions and alterations may be made to the invention without departing from the spirit and scope of the following claims.

I claim:

1. Securement apparatus for a vehicle rack, comprising:
   a tubular rack member defining a passageway and having a first open end defining a first opening into the passageway;
   a first end cap on said first open end, said first end cap having a first opening in communication with said passageway and said first end cap defining a first seat for receiving a first tie-down connector;
   a cord in the passageway and extending through said first opening in said first end cap;
   a first tie-down connector on said cord.

2. The securement apparatus of claim 1 wherein said cord is movable
   between a retracted position in which said first tie-down connector is received in said first seat and an extended position in which said first tie-down connector is spaced apart from said first end cap.

3. The securement apparatus of claim 2 wherein said cord has a first end and a second end and said first tie-down connector is on said first end, and including a stop for fixing said second end of said cord while allowing said cord to be moved into said extended position.

4. The securement apparatus of claim 2 wherein said rack member has a second open end opposite said first open end and a second end cap on said second open end, said second end cap defining a second seat for a second tie-down connector and having a second opening in communication with said passageway, wherein said first end of said cord extends through said first opening in said first end cap and said second end of said cord extends through said second opening in said second end cap, and a second tie-down connector on said second end of said cord.

5. The securement apparatus of claim 4 wherein said first and second tie-down connectors are respectively received in said first and second seats.

6. The securement apparatus of claim 5 wherein said cord is movable to the extended position in which the first tie-down connector is spaced apart from the first end cap.

7. The securement apparatus of claim 5 including a stop for fixing one end of said cord.

8. The securement apparatus of claim 7 in which the stop is defined by said second end cap.

* * * * *